(12) United States Patent
Sakamoto et al.

(10) Patent No.: US 6,750,934 B2
(45) Date of Patent: Jun. 15, 2004

(54) ACTIVE-MATRIX LIQUID CRYSTAL DISPLAY

(75) Inventors: Michiaki Sakamoto, Tokyo (JP); Yuji Yamamoto, Tokyo (JP); Mamoru Okamoto, Tokyo (JP); Masayoshi Suzuki, Tokyo (JP); Toshiya Ishii, Tokyo (JP); Teruaki Suzuki, Tokyo (JP); Hiroaki Matsuyama, Tokyo (JP); Kiyomi Kawada, Tokyo (JP); Seiji Suzuki, Tokyo (JP); Yoshihiko Hirai, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 09/739,478

(22) Filed: Dec. 18, 2000

(65) Prior Publication Data

US 2001/0004274 A1 Jun. 21, 2001

(30) Foreign Application Priority Data

Dec. 20, 1999 (JP) .......................... 11/361086

(51) Int. Cl.⁷ ............................................. G02F 1/1337
(52) U.S. Cl. ........................................ 349/129
(58) Field of Search ................. 349/139, 142, 349/143, 144, 145, 146

(56) References Cited

U.S. PATENT DOCUMENTS

| | | | | |
|---|---|---|---|---|
| 4,370,194 A | * | 1/1983 | Shaver et al. ................. | 216/23 |
| 5,179,456 A | | 1/1993 | Aizawa et al. ................. | 359/73 |
| 6,040,885 A | | 3/2000 | Koike et al. ................. | 349/129 |
| 6,057,896 A | * | 5/2000 | Rho et al. ..................... | 349/42 |
| 6,141,077 A | * | 10/2000 | Hirata et al. .................. | 349/143 |
| 6,222,599 B1 | * | 4/2001 | Yoshida et al. ............... | 349/106 |
| 6,341,002 B1 | * | 1/2002 | Shimizu et al. ............. | 349/119 |
| 6,466,296 B1 | * | 10/2002 | Yamada et al. ............. | 349/160 |
| 2002/0021400 A1 | * | 2/2002 | Lyu et al. ..................... | 349/178 |

FOREIGN PATENT DOCUMENTS

| | | | | |
|---|---|---|---|---|
| JP | 3-137619 | 6/1991 | ......... | G02F/1/1337 |
| JP | 5-173142 | 7/1993 | ......... | G02F/1/1337 |
| JP | 7-043719 | 2/1995 | ......... | G02F/1/1337 |
| JP | 07-084284 | 3/1995 | ........... | G02F/1/136 |
| JP | 07-311383 | 11/1995 | ......... | G02F/1/1337 |
| JP | 08-076125 | 3/1996 | ......... | G02F/1/1337 |
| JP | 10-096929 | 4/1998 | ......... | G02F/1/1337 |
| JP | 2947350 | 7/1999 | ......... | G02F/1/1337 |

* cited by examiner

Primary Examiner—Robert H. Kim
Assistant Examiner—Timothy L Rude
(74) Attorney, Agent, or Firm—Hayes Soloway P.C.

(57) ABSTRACT

A VA (Vertical Aligned) type active-matrix liquid crystal display capable of stabilizing a boundary position between divided areas (alignment areas). The liquid crystal display comprises a TFT (thin film transistor) substrate including a pixel electrode provided for each pixel and a driving element such as a TFT provided for each pixel electrode, an opposite substrate disposed opposite to the TFT substrate and including an opposite electrode, and a liquid crystal layer sandwiched between the TFT substrate and the opposite substrate. Each pixel electrode has a recess in groove shape formed therein. The pixel electrode preferably has a generally rectangular shape. The recess is provided such that it extends from one of a pair of opposite sides of the pixel electrode to the other to divide the pixel electrode into two parts.

16 Claims, 17 Drawing Sheets

ACTIVE-MATRIX LIQUID CRYSTAL DISPLAY

BACKGROUND OF THE INVENTION

1. Field of the Invention

The present invention relates to a liquid crystal display of an active matrix type, and more particularly to an active-matrix liquid crystal display of a multi-domain type with favorable viewing angle characteristics.

2. Description of the Prior Arts

Active-matrix liquid crystal displays which employ TN (twisted nematic) type liquid crystal have been widely used conventionally. An active-matrix liquid crystal display using the TN type liquid crystal comprises: a TFT (thin film transistor) substrate provided with a TFT for driving and a pixel electrode for each pixel; an opposite substrate having an opposite electrode thereon and disposed opposite to the TFT substrate; a color filter; and a polarizer. Liquid crystal is filled between the TFT substrate and the opposite substrate. In this liquid crystal display, when no voltage is applied between the pixel electrode and the opposite electrode, the TN liquid crystal molecules are aligned in parallel with the surface of the TFT substrate at that surface, and the alignment direction varies along the direction perpendicular to the substrate, resulting in twisted alignment of the liquid crystal. On the other hand, when a voltage is applied, the liquid crystal molecules between the substrates rise to change the polarization state in the liquid crystal layer. While the liquid crystal display using the TN type liquid crystal realizes selective display by utilizing the aforementioned change in the polarization state in the liquid crystal layer, visibility depends on the relationship between the alignment direction of the liquid crystal molecules and the position of a viewer, thereby presenting a problem of a small range of viewing angles for obtaining optimal visibility and resulting in insufficient viewing angle characteristics.

To overcome the problem, liquid crystal of a VA (vertical aligned) type has been proposed and put to practical use instead of the TN type liquid crystal for improving the insufficient viewing angle characteristics of the TN type liquid crystal display. A VA type liquid crystal display comprises a liquid crystal cell formed by liquid crystal in homeotropic (vertical) alignment with negative dielectric constant anisotropy between a TFT substrate and an opposite substrate, in which the liquid crystal molecules stand upright on the substrate when no voltage is applied, and when a voltage is applied, the liquid crystal molecules are laid in the substrate plane direction by an oblique electric field produced between a pixel electrode and an opposite electrode, thereby performing display. In this case, an area for one pixel is divided into a plurality of divided areas, and the directions in which the liquid crystal molecules are laid are varied among the divided areas to average the ways the display is viewed on the whole, which results in a wide viewing angle and favorable viewing angle characteristics. The divided area is also referred to as an alignment area. Such a liquid crystal display is referred to as a VA type multi-domain liquid crystal display.

While one pixel area is divided into a plurality of divided areas in accordance with directions in which the liquid crystal molecules are laid as described above in the VA type multi-domain liquid crystal display, it is important to provide stable dividing (partitioning) positions, that is, positions of boundaries between alignment areas. The dividing positions are boundaries of divided areas and the position in which so-called disclination occurs, and if division is made at an unexpected position, display quality is deteriorated.

As an attempt to stabilize the positions at which each pixel is divided into divided areas in the VA type multi-domain liquid crystal display, Japanese Patent Laid-open Publication No. 7-311383 (JP, A, 0731183) discloses a display which comprises an alignment control bank portion for each of a TFT substrate and an opposite substrate such that the positions at which the alignment control bank portions are provided are stabilized as dividing positions. FIG. 1 is a sectional view showing an example of a configuration of a VA type multi-domain liquid crystal display including an alignment control bank portion for each of a TFT substrate and an opposite substrate. FIG. 2 is a plan view schematically showing the arrangement of projections serving as the alignment control bank portions in the liquid crystal display shown in FIG. 1.

In the VA type multi-domain liquid crystal display shown in FIG. 1, liquid crystal layer 83 including a liquid crystal material with negative dielectric constant anisotropy is provided between TFT substrate 81 and opposite substrate 82 disposed opposite to each other. TFT substrate 81 comprises, on transparent support member 86, TFTs (thin film transistors) 87 for respective pixels and pixel electrodes 88 each electrically connected to a source electrode of corresponding TFT 87. On each pixel electrode 88, linear projections 89 each having a generally triangular cross section are provided as the alignment control bank portions. On the other hand, opposite substrate 82 has a structure in which color filter 92 and opposite electrode 93 are stacked in this order on transparent support member 91. On opposite electrode 93, linear projections 94 each having a generally triangular cross section are provided as the alignment control bank portions. As shown in FIG. 2, linear projections 89, 94 extend alternately in zigzag shape on TFT substrate 81 and opposite substrate 82, respectively.

Liquid crystal molecules 95 tend to be aligned perpendicularly to the surface of pixel electrode 88 and the surface of opposite electrode 93 when no voltage is applied. However, since the surfaces of projections 89 and 94 are inclined to the surfaces of pixel electrode 88 and opposite electrode 93, liquid crystal molecules 95 tend to be aligned in a direction slightly deviated from the direction perpendicular to the surfaces of pixel electrode 88 and opposite electrode 93. This affects the entire liquid crystal layer 83, and as a result, liquid crystal molecules 95 are aligned in a direction slightly deviated from the perpendicular direction even when no voltage is applied, as shown in FIG. 1. When a voltage is applied between pixel electrode 88 and opposite electrode 93, the alignment of liquid crystal molecules 95 is changed such that they are inclined in a direction deviated further from the perpendicular direction. The direction of the inclination when no voltage is applied depends on the positional relationships between liquid crystal molecules 95 and linear projections 89, 94 as shown in FIG. 2.

As a result, projections 89 and 94 determine the dividing position between divided areas A and B to stabilize the dividing position in this VA type multi-domain liquid crystal display.

In addition, Japanese Patent Laid-open Publication No. 8-76125 (JP, A, 08076125) proposes a display in which an opposite electrode itself is divided to stabilize dividing positions instead of using the aforementioned alignment control bank portions (i.e., linear projections). In a VA type liquid crystal display using a liquid crystal material with negative dielectric constant anisotropy, when a voltage is applied, the liquid crystal molecules tend to be aligned in the direction perpendicular to the electrical field. As shown in FIG. 3, division of opposite electrode 93 by slit 96 and pixel electrode 88 already provided for each pixel produce wraparound electric fields as shown in arrows in FIG. 3 between pixel electrode 88 and opposite electrode 93 when a voltage is applied. In the area in which the wraparound electric field is produced, i.e. near the ends of pixel electrode 88 and near the ends of opposite electrode 93, liquid crystal molecules 95 tend to be aligned perpendicularly to the direction of the wraparound electric field when a voltage is applied. For this reason, liquid crystal molecules 95 in the entire liquid crystal layer 83 are divided into a plurality of divided areas A and B in terms of alignment as shown in FIG. 3, and the boundary of the divided areas is formed in a stable position in accordance with the position of slit 96 and the shape or position of pixel electrode 88.

However, in an active-matrix liquid crystal display which serves as the aforementioned conventional VA type multi-domain liquid crystal display, an alignment control bank portion, if formed, must be provided for each of a TFT substrate and an opposite substrate. Since the opposite substrate need not be subjected to significant fine processing if no alignment control bank portion is provided, the provision of the alignment control bank portions not only for the TFT substrate but also for the opposite substrate requires fine processing on the opposite substrate, resulting in increased fabricating steps. Also, when the opposite electrode is divided by the slit, fine processing is required for the opposite electrode to cause increased fabricating steps.

SUMMARY OF THE INVENTION

It is an object of the present invention to provide an active-matrix liquid crystal display capable of stabilizing boundary positions of divided areas (alignment areas) without increasing fabricating steps, specifically, fine processing on an opposite substrate.

In the present invention for achieving the aforementioned object, a recess in groove shape is provided only for each pixel electrode as a division control structure without providing a particular division control structure for an opposite substrate.

In this case, if the pixel electrode is formed continuously across the recess, liquid crystal molecules within the recess are laid in the longitudinal direction of the recess when a voltage is applied between the pixel electrode and the opposite electrode, thereby fixing a boundary between divided areas.

Alternatively, in the case of a structure in which a conductive layer of a pixel electrode is removed in a recess, liquid crystal molecules in the recess remain perpendicular to both substrates when a voltage is applied, thereby fixing a boundary between divided areas.

In this manner, according to the present invention, a boundary position between divided areas (alignment areas) can be stabilized using the uniformly formed opposite electrode with the provision of the recess in groove shape only for the pixel electrode side and without requiring fine processing for alignment control on the opposite substrate side.

The above and other objects, features, and advantages of the present invention will become apparent from the following description referring to the accompanying drawings which illustrate examples of preferred embodiments of the present invention.

DESCRIPTION OF THE PREFERRED EMBODIMENTS

Figure 1:
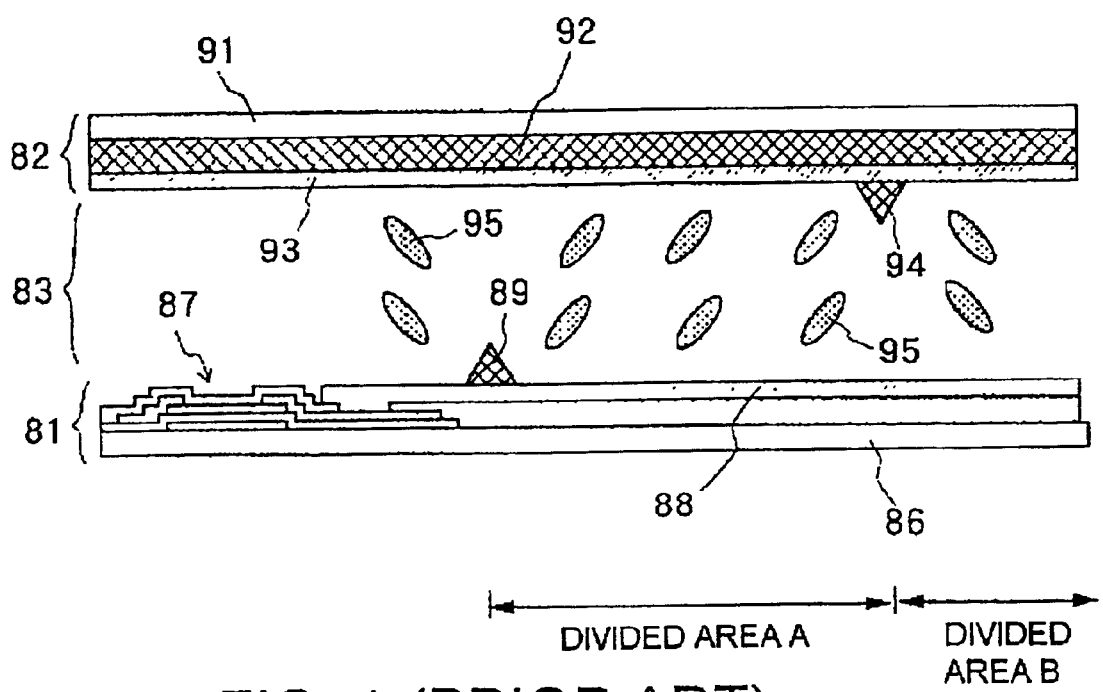
FIG. 1 is a sectional view showing an example of a configuration of a conventional VA (vertical aligned) type multi-domain liquid crystal display.
Figure 2:
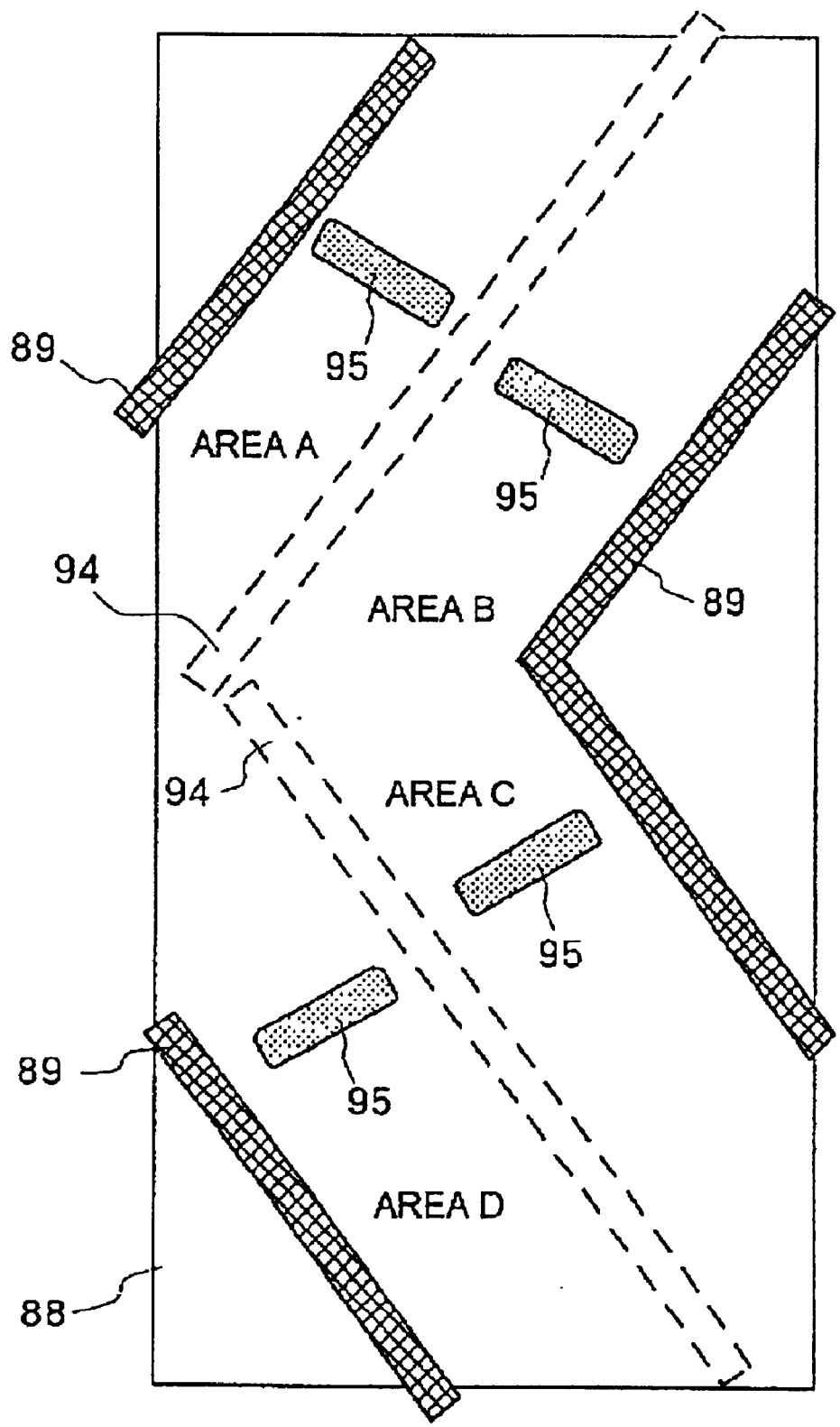
FIG. 2 is a plan view schematically showing the arrangement of linear projections serving as alignment control bank portions in the liquid crystal display shown in FIG. 1.
Figure 3:
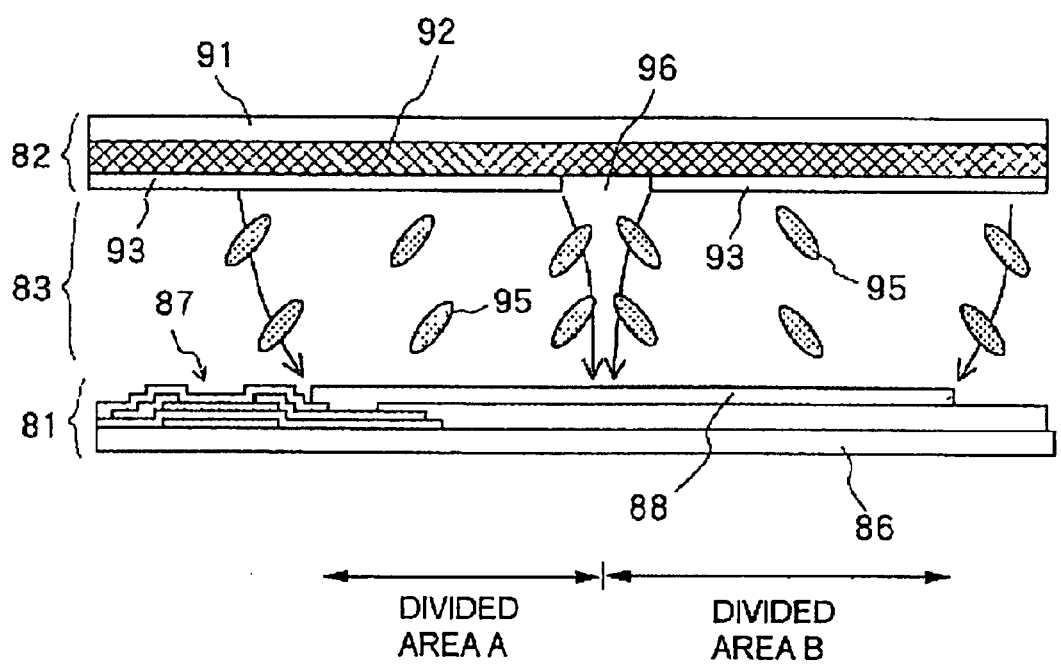
FIG. 3 is a sectional view showing another example of a configuration of the conventional VA type multi-domain liquid crystal display.
Figure 4:
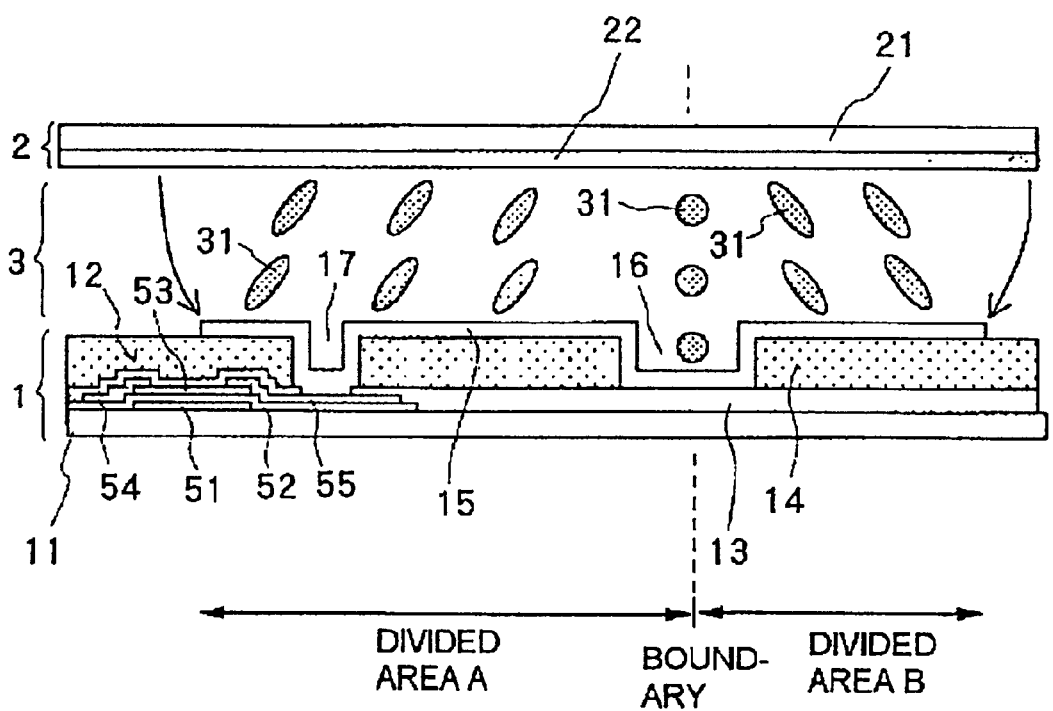
FIG. 4 is a sectional view showing a configuration of an active-matrix liquid crystal display according to a first embodiment of the present invention.

Referring to FIG. 4, there is shown a liquid crystal display of an active-matrix type according to a first embodiment of the present invention which is configured as a VA type multi-domain liquid crystal display and which is provided with a plurality of pixels. The liquid crystal display comprises TFT substrate 1 which serves as a first substrate, opposite substrate 2 which serves as a second substrate and is disposed opposite to TFT substrate 1 with a predetermined interval between them, and liquid crystal layer 3 sandwiched and filled between TFT substrate 1 and opposite substrate 2. Liquid crystal layer 3 comprises a liquid crystal material having negative dielectric constant anisotropy and homeotropic alignment.

TFT substrate 1 comprises: support member 11 formed of a transparent member such as a glass substrate; TFT 12 provided for each pixel on support member 11; passivation layer 13 formed of a silicon nitride for covering and protecting TFTs 12; overcoat layer 14 provided on passivation layer 13 and formed of an acrylic resin, for example; and pixel electrode 15 provided for each pixel on overcoat layer 14 and comprising a conductive layer such as an ITO (indium oxide plus tin oxide) film. TFT 12 is used as a driving element for driving the corresponding pixel. Passivation layer 13 is formed directly on support member 11 in the region other than the area in which TFT 12 is formed. In this configuration, a groove formed in overcoat layer 14 provides recess 16 in groove shape in each pixel electrode 15. Each pixel electrode 15 is deposited directly on passivation layer 13 at the bottom of recess 16, and formed continuously over the side surfaces of recess 16. Thus, the depth of recess 16 is approximately equal to the thickness of overcoat layer 14. In the example here, the cross section of recess 16 is generally rectangular.

Figure 6A:
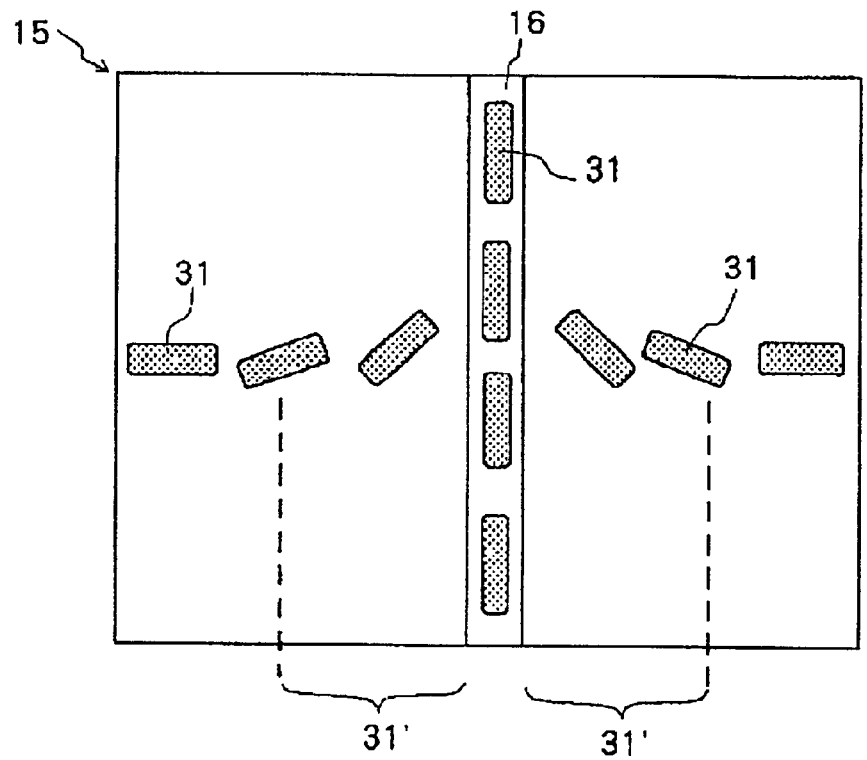
FIGS. 6A and 6B are schematic plan views for explaining the alignment of the liquid crystal molecules when a voltage is applied in the liquid crystal display shown in FIG. 4.
Figure 6B:
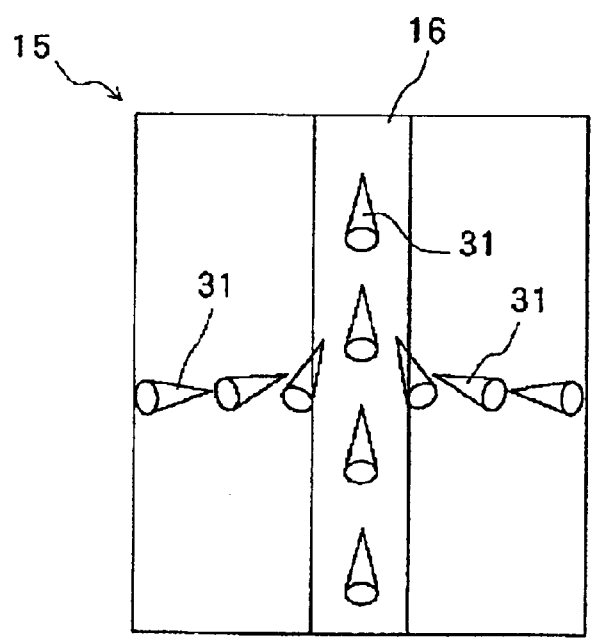

The width of recess 16 is preferably 5 μm or more, and typically approximately 10 μm. The depth of recess 16, i.e. the thickness of overcoat layer 14 is preferably 1 μm or more. As shown in FIG. 6A and 6B, later described, pixel electrode 15 has a generally rectangular shape, and recess 16 in groove shape extends to both ends of pixel electrode 15 in its longitudinal direction and generally divides pixel electrode 15 into two parts.

Pixel electrode 15 is connected to a source electrode of associated TFT 12 through contact hole 17 penetrating passivation layer 13 and overcoat layer 14.

It should be noted that while the shape of pixel electrode 15 is generally rectangular in this embodiment, the pixel electrode in the present invention is not limited to the generally rectangular shape. The pixel electrode preferably has a generally rectangular shape including a square or an oblong, but a triangle, a parallelogram, or various types of polygons may be used.

TFT 12 comprises gate bus line 51, oxide film (gate insulating film) 52 formed to cover gate bus line 51, channel area 53 provided across oxide film 52 from gate bus line 51, drain electrode 54 and source electrode 55 provided at both ends of channel area 53. Drain electrode 54 is connected to a drain bus line, not shown.

Opposite substrate 2, in turn, comprises support member 21 formed of a transparent member such as a glass substrate, and opposite electrode 22 provided on support member 21 and formed of ITO, for example. Opposite electrode 22 is uniformly formed over the entire one surface of opposite substrate 2.

Although not shown, vertical alignment films are applied on the surface of pixel electrode 15 and the surface of opposite electrode 22 for vertically aligning liquid crystal molecules 31. In addition, similarly to a normal VA type liquid crystal display, a color filter, a polarizer, a black matrix and the like are provided.

Figure 5:
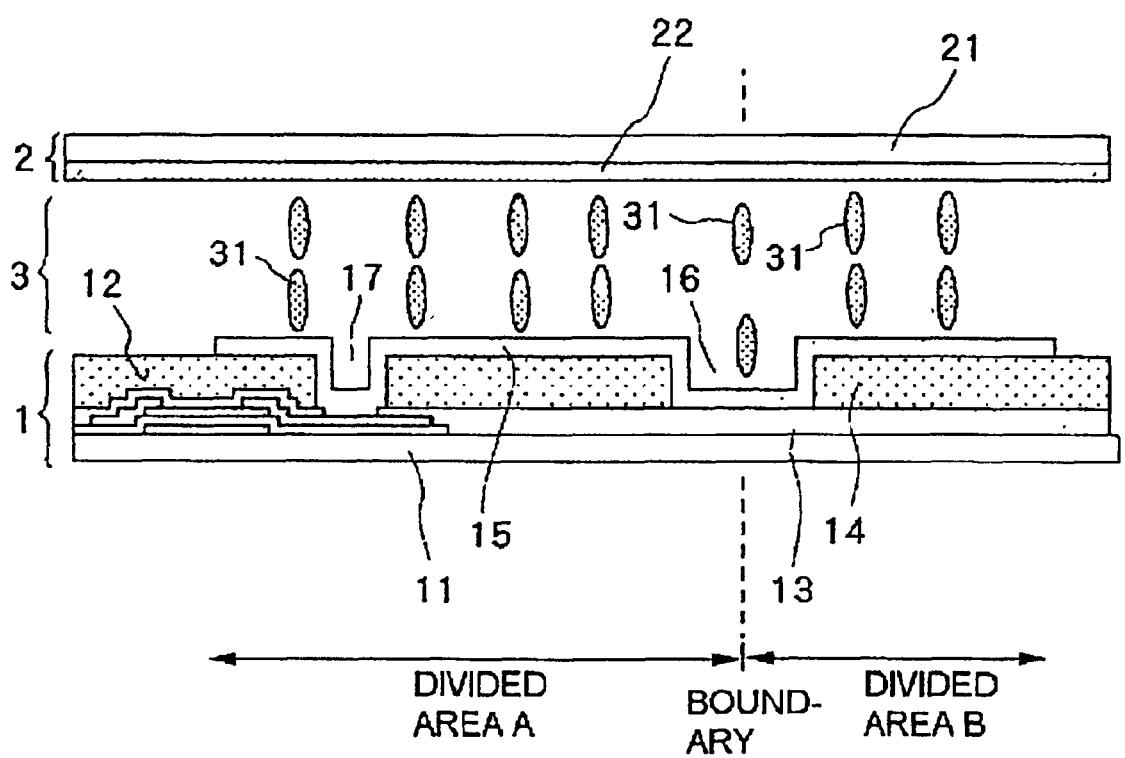
FIG. 5 is a sectional view for explaining the alignment of liquid crystal molecules when no voltage is applied in the liquid crystal display shown in FIG. 4.

Next, description is made for changes in the alignment of the liquid crystal molecules in the active-matrix liquid crystal display. FIG. 4 shows the alignment of liquid crystal molecules 31 when a voltage is applied between pixel electrode 15 and opposite electrode 22. FIG. 5 is a sectional view for explaining the alignment of the liquid crystal molecules when no voltage is applied. FIGS. 6A and 6B are schematic plan views for explaining the alignment of the liquid crystal molecules in the substrate plane direction when a voltage is applied. While FIG. 6A shows liquid crystal molecules 31 as rods which mimic the actual shape of the molecules and FIG. 6B shows liquid crystal molecules 31 as conical symbols for representation including directions in which the molecules are laid, FIGS. 6A and 6B illustrate substantially the same contents.

When no voltage is applied, liquid crystal molecules 31 are aligned perpendicularly to TFT substrate 1 and opposite substrate 2 as shown in FIG. 5. When a voltage is applied between pixel electrode 15 and opposite electrode 22, liquid crystal molecules 31 within recess 16 are laid uniformly in the longitudinal direction of recess 16. On the other hand, at the ends of pixel electrode 15, since wraparound electric fields are produced as shown by arrows in FIG. 4, the alignment direction of liquid crystal molecules 31 is changed rightward in the left end portion and leftward in the right end portion in FIG. 4. As a result, when viewed in the substrate plane direction as shown in FIGS. 6A and 6B, liquid crystal molecules 31 are laid in the direction substantially perpendicular to the longitudinal direction of pixel electrode 15 at the ends of the pixel electrode, and the lying direction is changed continuously toward recess 16, and at recess 16, the molecules are laid in the longitudinal direction. Thus, the boundary between divided areas A and B is fixed at recess 16 in groove shape without performing special processing on opposite substrate 2, thereby making it possible to achieve a stable display condition. Since the direction in which liquid crystal molecules 31 are laid is continuously changed and the state of the direction change is stable, anisotropy of visibility is averaged to allow the realization of a liquid crystal display with slight viewing angle dependence.

It should be noted that while FIG. 4 also shows a recess formed in pixel electrode 15 at the position of contact hole 17, this recess does not extend in groove shape but is formed as a hole with substantially the same width and length for use as a contact hole. Therefore, contact hole 17 does not contribute to the alignment of liquid crystal molecules 31 as described above. In addition, the recess formed in contact hole 17 may be filled, for example, on some conditions for deposition of pixel electrode 15.

Figure 7:
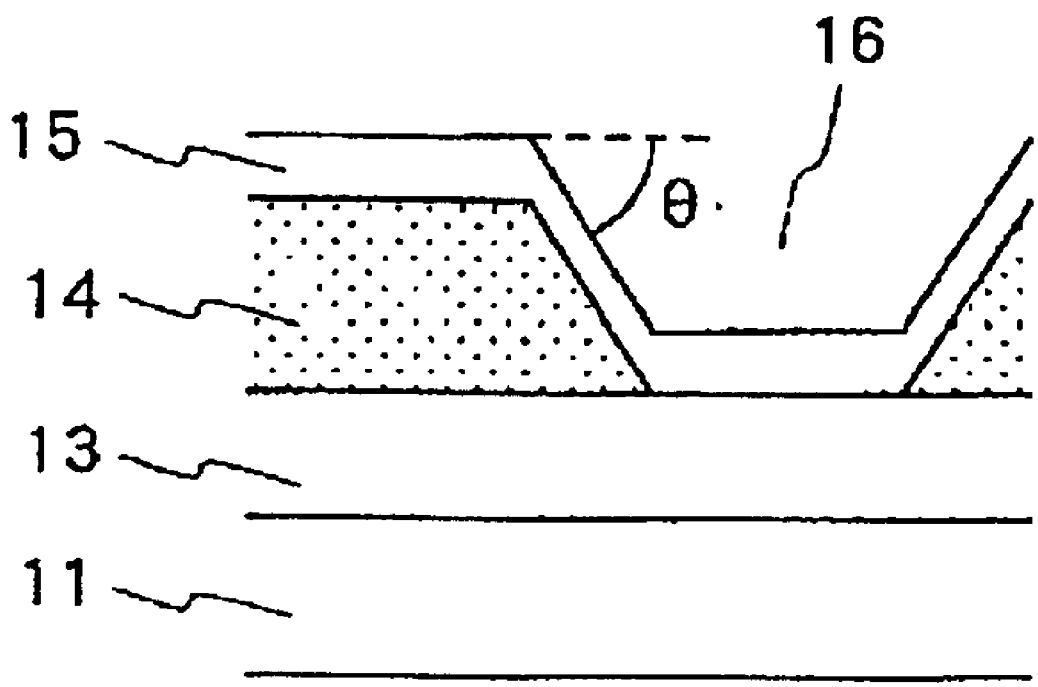
FIG. 7 is a diagram for explaining a taper angle of a recess.

Next, the cross section of recess 16 in groove shape is described. While the cross section of recess 16 is generally rectangular in the example shown in FIG. 4, the present invention is not limited thereto. The cross section may be reversed trapezoidal, for example, as long as liquid crystal molecules 31 are stably laid within recess 16 in the longitudinal direction of recess 16 when a voltage is applied. When the angle formed between a plane in parallel with the substrate surface and the side of recess 16 is represented as a taper angle θ as shown in FIG. 7, θ is preferably equal to or larger than 60 degrees and equal to or smaller than 90 degrees. The angle θ smaller than 30 degrees is not preferable since the slope of recess 16 may serve similarly to the alignment control bank portion disclosed in JP, A, 07311383 to inhibit stable lying of liquid crystal molecules 31 in the longitudinal direction of the recess.

Next, the plane shape of recess 16 is described.

Recess 16 has the groove shape extending linearly in the example in FIGS. 6A and 6B. However, the plane shape of recess 16 is not limited thereto in the present invention, and a recess extending diagonally on the pixel electrode or in zigzag shape may be included.

Figure 8:
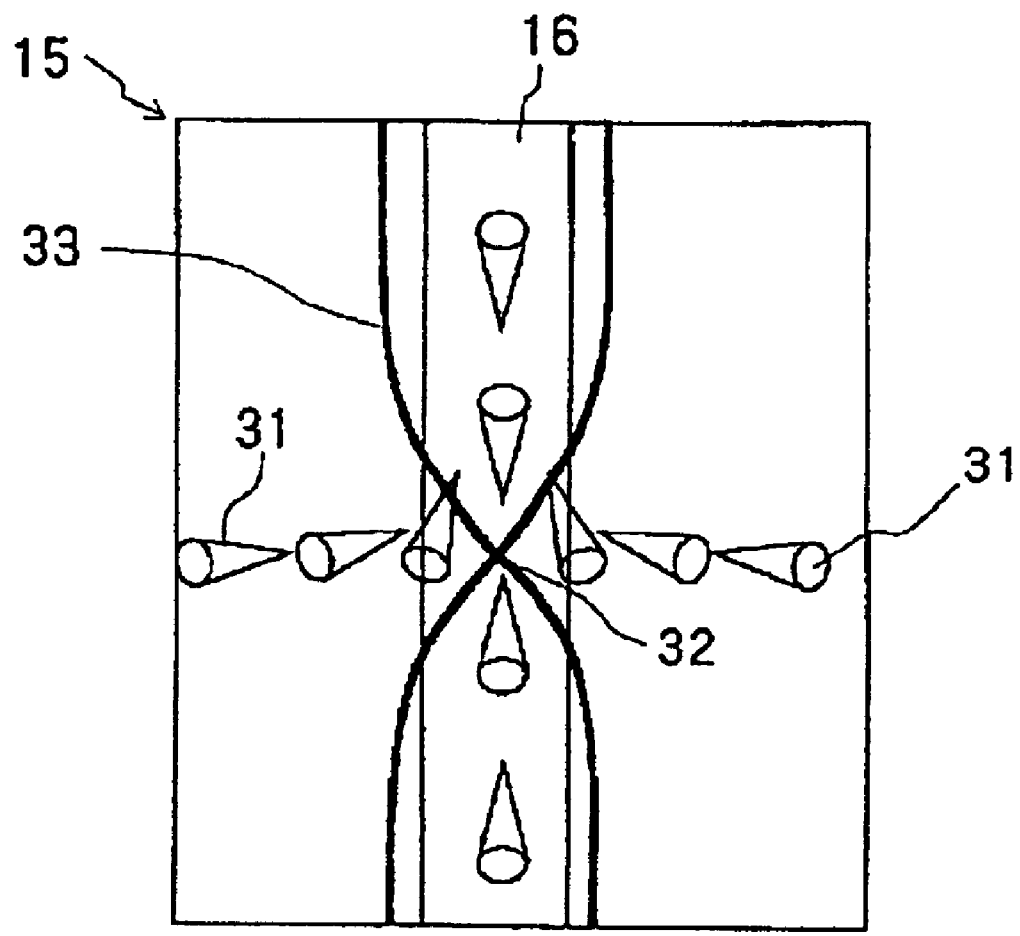
FIG. 8 is a schematic plan view for explaining disclination caused by a node produced at the recess.

If recess 16 extending linearly with a uniform width as shown in FIGS. 6A and 6B is too long, node 32 may occur somewhere in recess 16 as shown in FIG. 8 when a voltage is applied, and the lying direction of liquid crystal molecules 31 may be reversed on opposite sides of node 32. As a result, disclination line 33 is produced as shown with bold line 33 in FIG. 8. In addition, since the position at which node 32 occurs is not stable, the generation of such node 32 leads to an alignment defect and may cause deteriorated quality of display. Thus, to restrict the direction in which liquid crystal molecules 31 are laid within recess 16, it is contemplated that the plane shape of recess 16 is changed.

Figure 9:
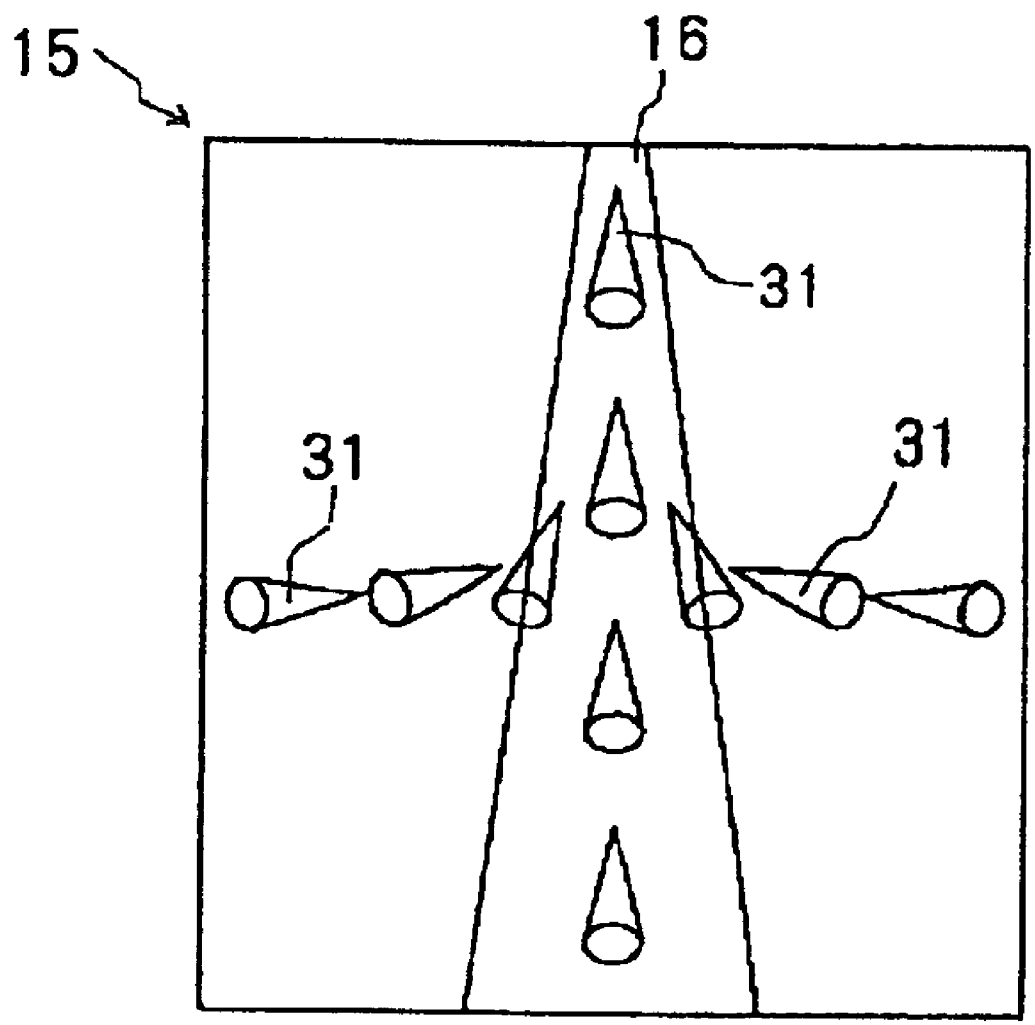
FIG. 9 is a schematic plan view showing another example of the plane shape of the recess.

FIG. 9 illustrates an example in which recess 16 is formed to have a tapered groove shape such that recess 16 has a small width at one short side of pixel electrode 15 in generally rectangular shape and has a large width at the other short side. Such a configuration restricts the direction in which liquid crystal molecules 31 are laid at the side at which recess 16 has the small width, which propagates to the other side at which recess 16 has the large width. Thus, on the whole, the direction in which the liquid crystal molecules are laid within recess 16 is determined in a predetermined direction without producing any node.

Figure 10:
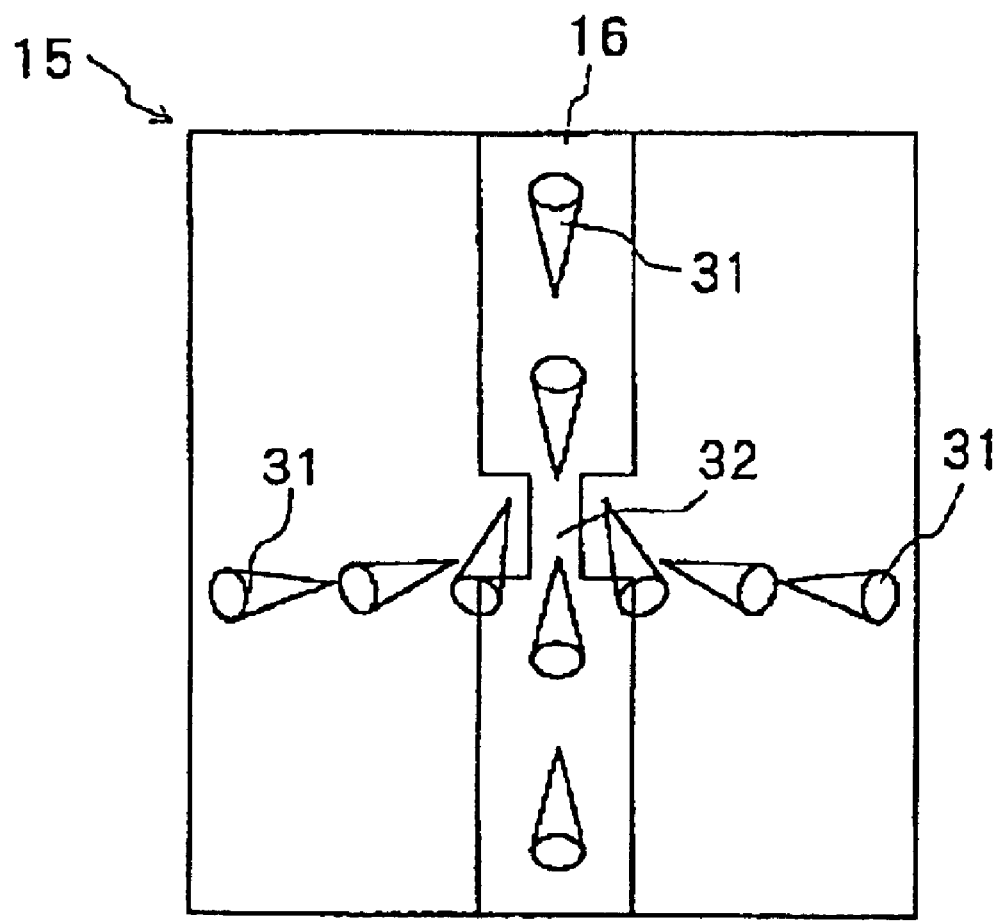
FIG. 10 is a schematic plan view showing another example of the plane shape of the recess.

FIG. 10 shows an example in which the generation of node 32 is permitted but the occurrence position thereof is fixed. Specifically, recess 16 is formed as a linear groove with a uniform width except a reduced width in stepped shape only at a position at which node 32 is to be produced. Such a configuration forms node 32 stably at this position.

Figure 11:
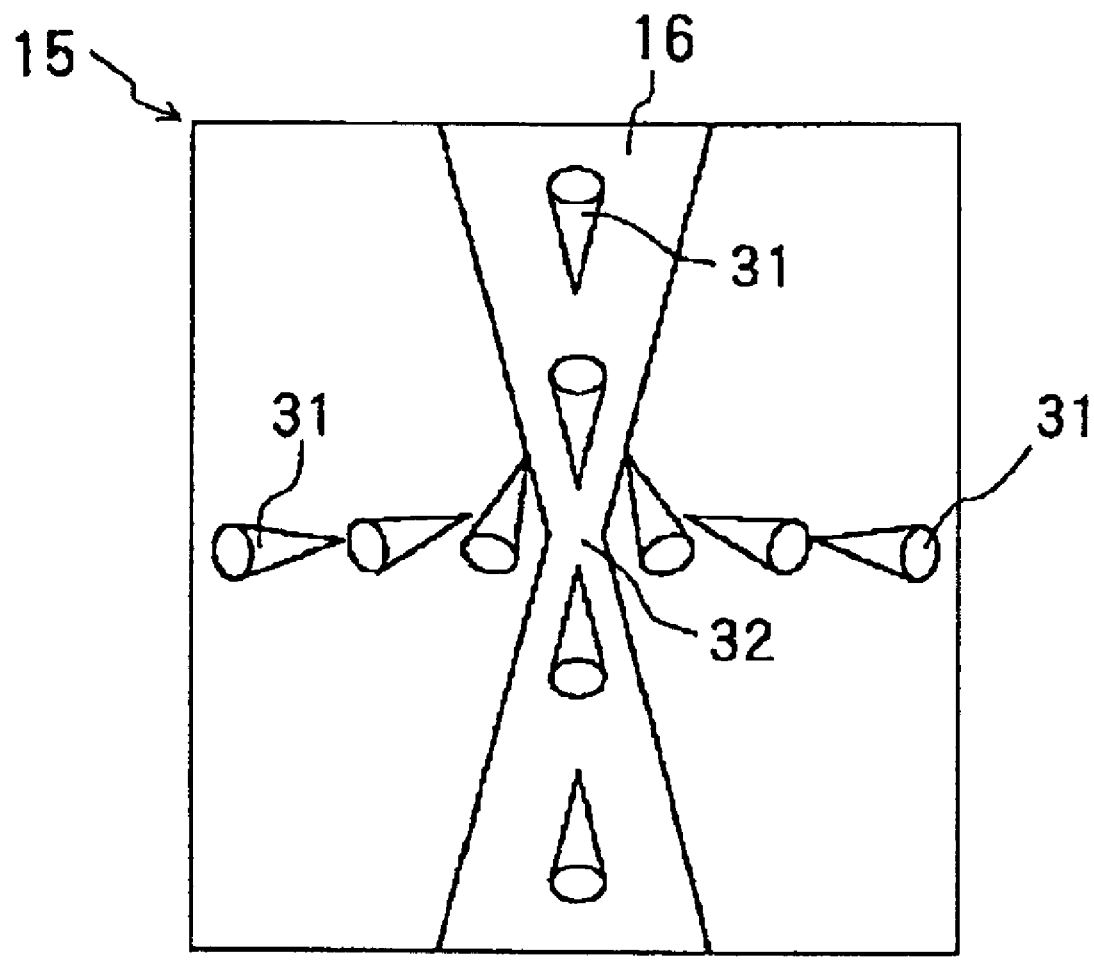
FIG. 11 is a schematic plan view showing another example of the plane shape of the recess.

FIG. 11 also shows an example in which the occurrence position of node 32 is fixed. Recess 16 is formed such that the width thereof is the smallest at the occurrence position of node 32 and is gradually increased toward both short sides of pixel electrode 15. Such a configuration forms node 32 stably at this position.

In the active-matrix liquid crystal display of the present invention, at least one optical compensating plate may be provided between the polarizer and the liquid crystal cell for further improving viewing angle characteristics. Since the liquid crystal molecules are perpendicularly aligned in each liquid crystal cell when no voltage is applied in the liquid crystal display of this embodiment, it is preferable to use an optically negative compensating plate as the optical compensating plate from the viewpoint of the cancellation of changes in retardation when viewed from an oblique direction. Such a compensating plate may be a single film formed with a method such as biaxial stretching, or may be a substantially optically negative uniaxial compensating plate formed by laminating two or more uniaxially oriented films. Similar effects can be obtained both when such a biaxially oriented film is used and when such laminated uniaxially oriented films are used.

In some liquid crystal displays, when liquid crystal molecules are laid in response to application of a voltage, a transition area occurs between regions in which the molecules are laid in different directions. As shown in FIG. 6A, transition area 31' refers to an area in which the lying direction of the liquid crystal molecules is continuously changed from perpendicularly to horizontally in the figure, for example. This transition area is observed as a black area under orthogonal polarizers and causes reduced brightness in the liquid crystal display. In some cases, moves are slow in the transition area to reduce an apparent response speed. In such a case, particularly when the aforementioned uniaxially oriented film is used as a quarter-wave plate, moves in the boundary portion are made invisible to obtain an apparently quick response. The quarter-wave plates are preferably disposed on both sides of the liquid crystal cell and arranged orthogonally to each other such that each of the optical axes of the quarter-wave plates forms an angle of 45 degrees with each of the absorption axes of the orthogonal polarizer pair.

Figure 12:
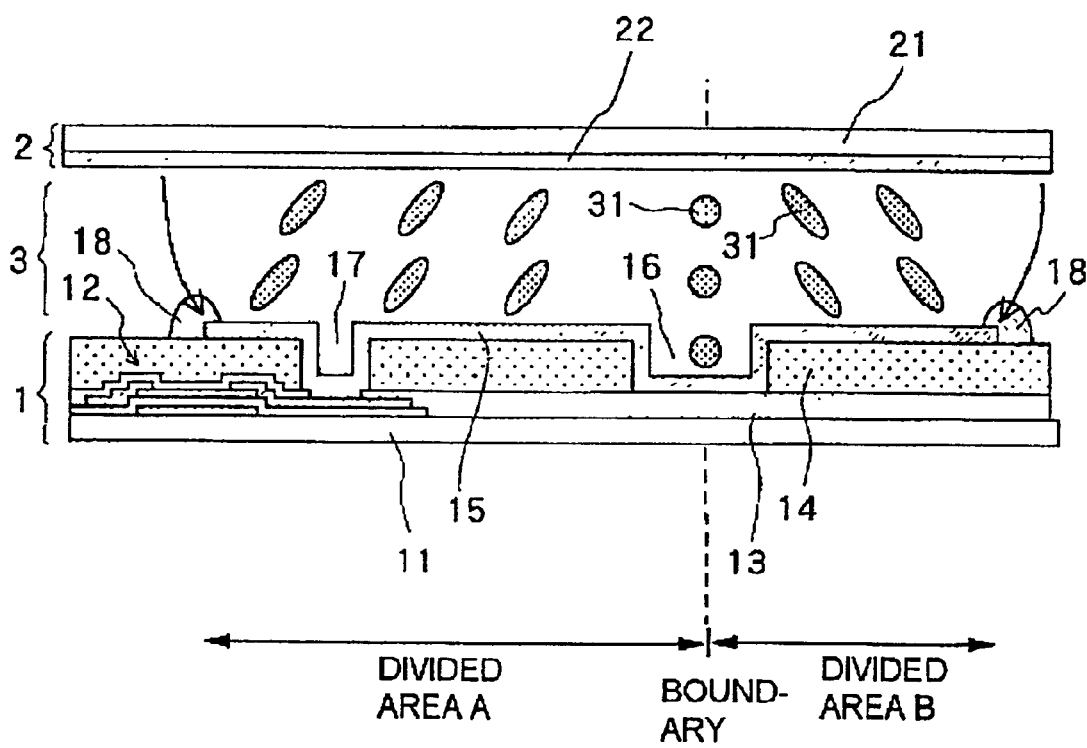
FIG. 12 is a sectional view showing a configuration of an active-matrix liquid crystal display according to a second embodiment of the present invention.
Figure 13:
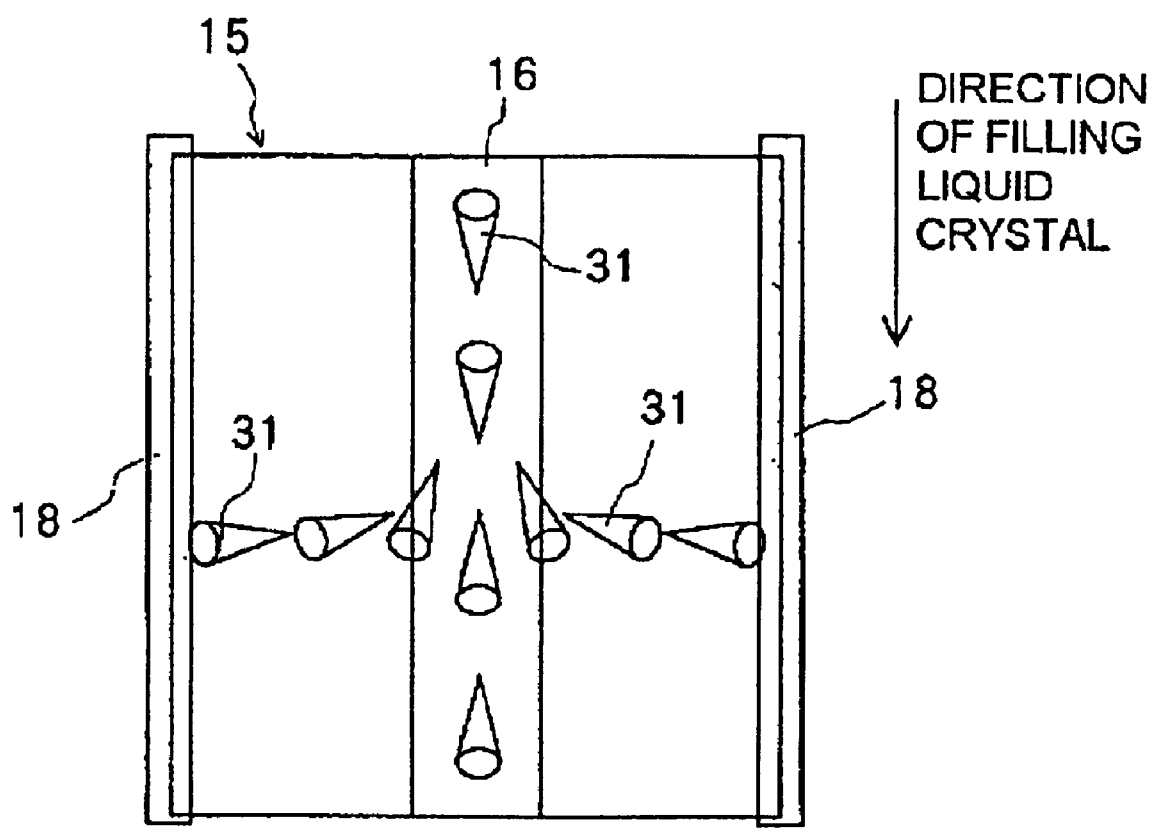
FIG. 13 is a schematic plan view for explaining the alignment of liquid crystal molecules when a voltage is applied in the liquid crystal display shown in FIG. 12.

Next, description is made for an active-matrix liquid crystal display according to a second embodiment of the present invention with reference to FIGS. 12 and 13. The liquid crystal display has a configuration substantially similar to that of the liquid crystal display shown in FIGS. 4, 5, 6A and 6B, but differs in guide 18 provided in bank shape along both long sides of pixel electrode 15. Guide 18 is provided for filling liquid crystal in one direction in the area of pixel electrode 15 for each pixel electrode 15 when TFT substrate 1 and opposite substrate 2 are arranged opposite to each other and then the liquid crystal material is filled between them in fabricating the liquid crystal display. Specifically, the liquid crystal is filled in one direction along the direction in which recess 16 in groove shape extends.

When the liquid crystal material of a vertical alignment type is filled in one direction in the gap between substrates in this manner, it is known that the liquid crystal molecules tend to be laid in one direction when a voltage is applied. Thus, in this liquid crystal display, even when recess 16 is formed linearly with a uniform width, liquid crystal molecules 31 are laid in one direction within recess 16 without producing a node when a voltage is applied. This enables image display with no alignment defect.

Figure 14:
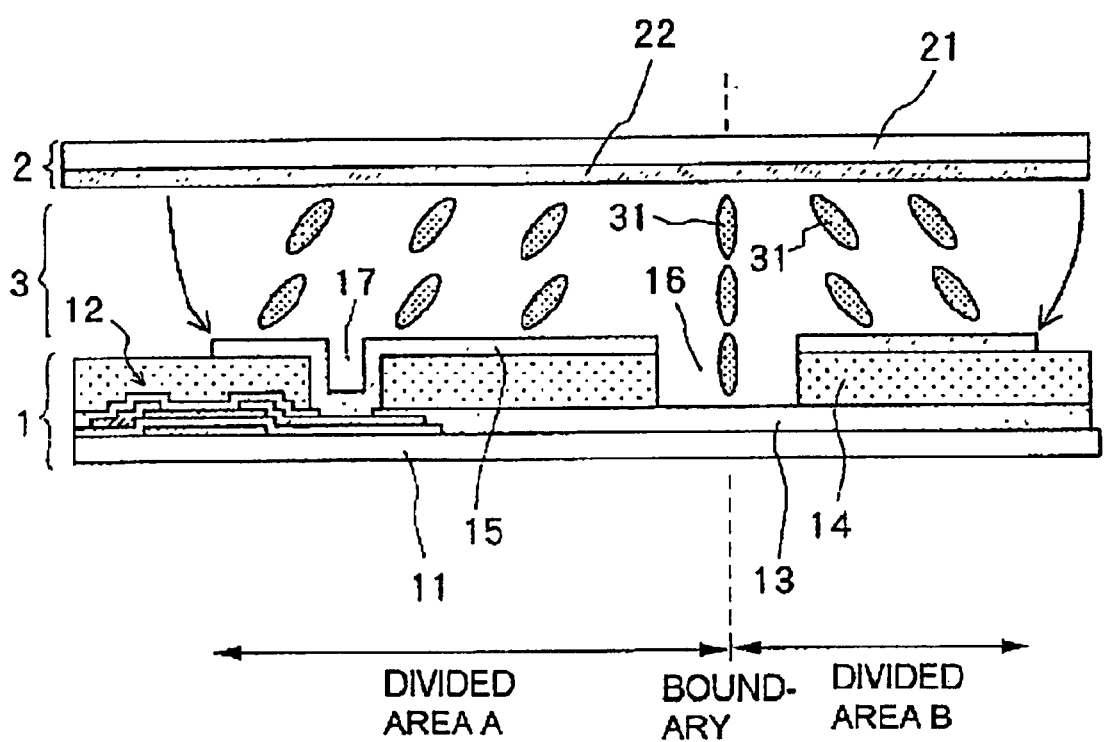
FIG. 14 is a sectional view showing a configuration of an active-matrix liquid crystal display according to a third embodiment of the present invention.
Figure 15:
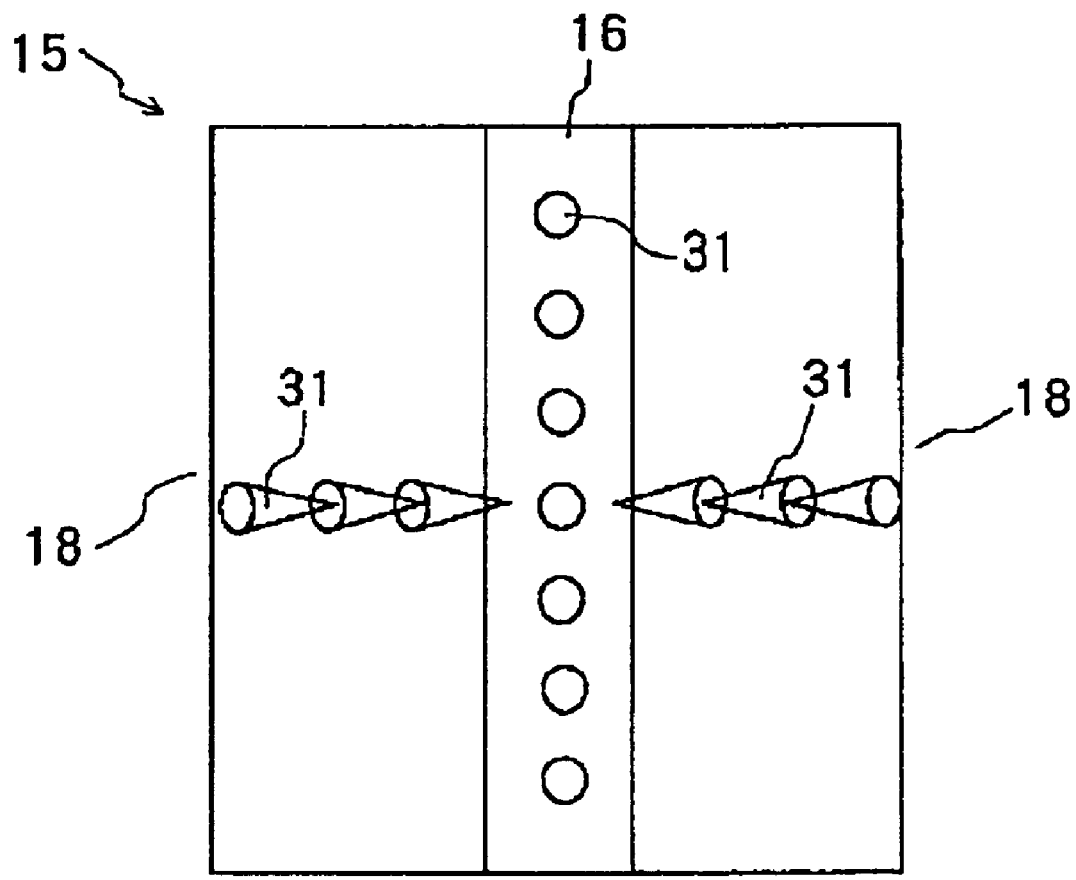
FIG. 15 is a schematic plan view for explaining the alignment of liquid crystal molecules when a voltage is applied in the liquid crystal display shown in FIG. 14.

Next, description is made for an active-matrix liquid crystal display according to a third embodiment of the present invention with reference to FIGS. 14 and 15. The liquid crystal display has a configuration substantially similar to that of the liquid crystal display shown in FIGS. 4, 5, 6A and 6B, but differs in that the conductive layer of pixel electrode 15 is not formed on the sides and bottom of recess 16 in groove shape. Areas in pixel electrode 15 on both sides of recess 16 are electrically connected to each other.

FIGS. 14 and 15 show the alignment of liquid crystal molecules 31 when a voltage is applied. In the liquid crystal display, an electrical field from opposite electrode 22 has no effect within recess 16 since the conductive layer of pixel electrode 15 is not formed on the sides and bottom of recess 16. In addition, since the width of recess 16 is typically larger than the depth thereof, liquid crystal molecules 31 remain perpendicular to both substrates within recess 16 even when a voltage is applied between pixel electrode 15 and opposite electrode 22. The alignment of liquid crystal molecules 31 perpendicular to both substrates within recess 16 causes liquid crystal molecules 31 above recess 16 to be aligned perpendicularly to both substrates even when a voltage is applied. In contrast, since wraparound electric fields are produced in the left and right end portions of pixel electrode 15 as shown by arrows in FIG. 14, liquid crystal molecules 31 there are inclined rightward and leftward, respectively. As a result, also in this liquid crystal display, an area for one pixel electrode 15 is divided into two divided areas A and B with different alignment directions at the boundary of the position of recess 16. However, since liquid crystal molecules 31 are aligned perpendicularly to the substrates at the position of recess 16, no area exists in which the direction of alignment is continuously changed, and the alignment direction of liquid crystal molecules 31 is substantially uniform in each divided area.

Figure 16:
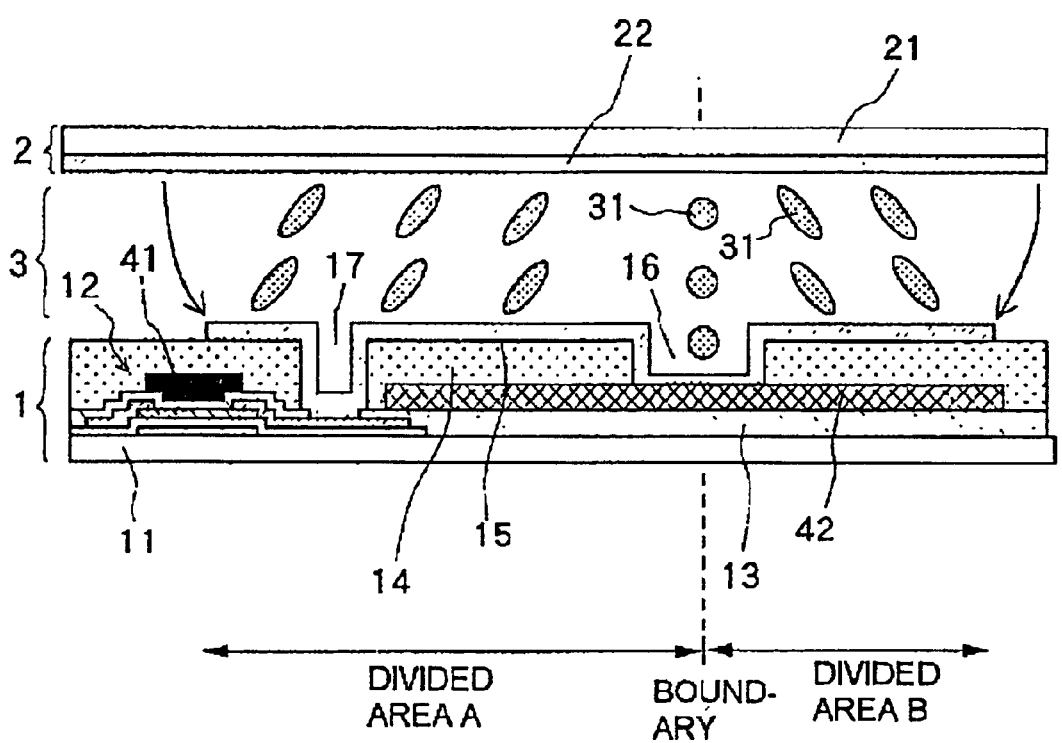
FIG. 16 is a schematic sectional view showing an active-matrix liquid crystal display including a color filter and a black matrix in a TFT substrate.

In the active-matrix liquid crystal display of the present invention, it is possible to incorporate a color filter in the TFT substrate or the opposite substrate. FIG. 16 shows an example in which a color filter and a black matrix are incorporated in the TFT substrate in the liquid crystal display shown in FIGS. 4, 5, 6A and 6B. Color filter 42 is inserted between passivation layer 13 and overcoat layer 14 below the area of pixel electrode 15 in TFT substrate 1. Pixel electrode 15 is formed directly on color filter 42 at the bottom of recess 16. Black matrix 41 is provided between passivation layer 13 and overcoat layer 14 for shielding the channel area of TFT 12 from light.

Figure 17:
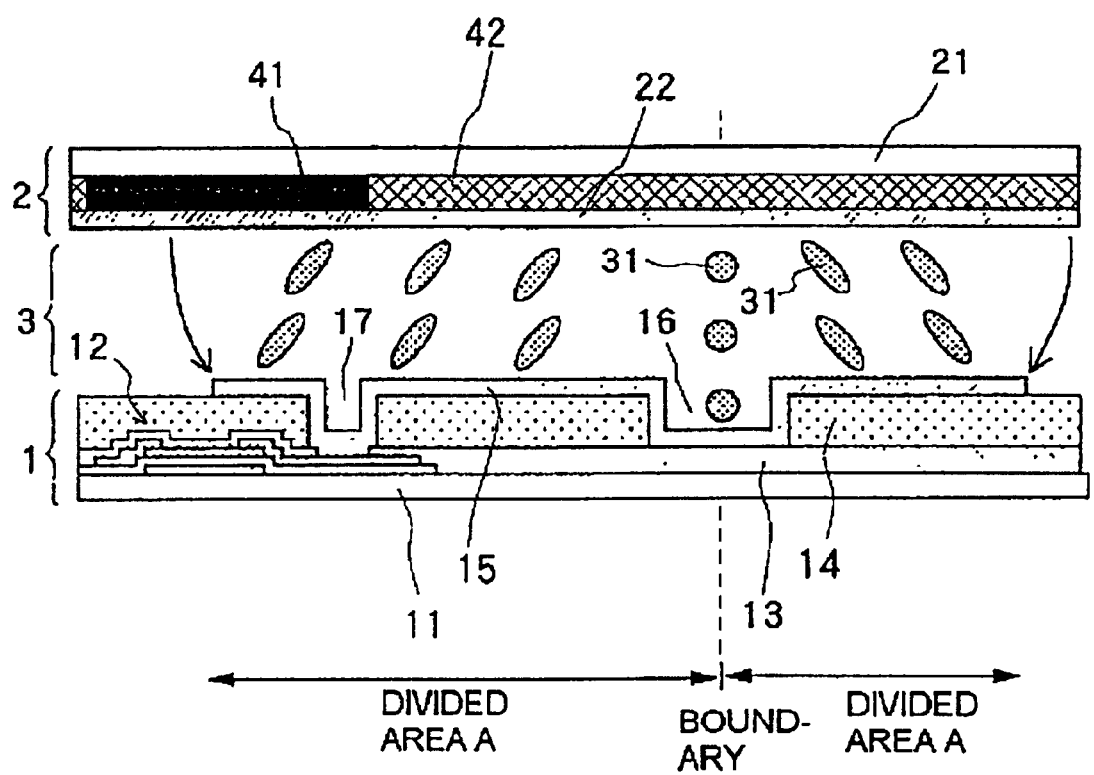
FIG. 17 is a schematic sectional view showing an active-matrix liquid crystal display including a color filter and a black matrix in an opposite substrate.

On the other hand, FIG. 17 shows an example in which black matrix 41 and color filter 42 are provided in opposite substrate 2. Color filter 42 is provided between support member 21 and opposite electrode 22 at the position in opposite substrate 2 opposite to pixel electrode 15. In addition, black matrix 41 is provided between support member 21 and opposite electrode 22 at the position opposite to TFT 12 for shielding TFT 12 from light.

While preferred embodiments of the present invention have been described using specific terms, such description is for illustrative purposes only, and it is to be understood that changes and variations may be made without departing from the spirit or scope of the following claims.

What is claimed is:

1. An active-matrix liquid crystal display comprising:
    a first substrate including a pixel electrode provided for each pixel, and a driving element provided for each of said pixel electrodes;
    a second substrate disposed opposite to said first substrate and including an opposite electrode; and
    a liquid crystal layer sandwiched between said first substrate and said second substrate, wherein said pixel electrode has a generally rectangular shape, and a recess in groove shape is formed therein extending from one of a pair of opposite sides of said pixel electrode to the other to divide said pixel electrode into two parts, said recess being formed linearly with a constant width except that it has a smaller width in the central portion in a longitudinal direction.

2. An active-matrix liquid crystal display according to claim 1, wherein, when a voltage is applied between said pixel electrode and said opposite electrode, liquid crystal molecules in said liquid crystal layer are laid toward a longitudinal direction of said recess in accordance with magnitude of said voltage.

3. An active-matrix liquid crystal display according to claim 1, wherein said pixel electrode is continuously formed across said recess.

4. An active-matrix liquid crystal display according to claim 1, wherein a conductive layer of said pixel electrode is removed in said recess.

5. An active-matrix liquid crystal display according to claim 1, further comprising a guide in bank shape formed on said first substrate along a side of said pixel electrode in parallel with a longitudinal direction of said recess.

6. An active-matrix liquid crystal display according to claim 1, further comprising:
    a polarizer; and
    at least one of an optically negative compensating film and an optically positive compensating film provided between said first substrate or said second substrate and said polarizer, whereby refractive index anisotropy in a layer including said liquid crystal layer and said compensating film is made isotropic.

7. An active-matrix liquid crystal display according to claim 1, wherein said liquid crystal layer comprises a liquid crystal material with negative dielectric constant anisotropy, and liquid crystal molecules in said liquid crystal layer are aligned perpendicularly to each of said substrate when no voltage is applied between said pixel electrode and said opposite electrode.

8. An active-matrix liquid crystal display according to claim 7, further comprising quarter-wave plates provided on both sides of said liquid crystal layer, respectively, said quarterwave plates having optical axis orthogonal to each other.

9. An active-matrix liquid crystal display comprising:
    a first substrate including a pixel electrode provided for each pixel, and a driving element provided for each of said pixel electrodes;
    a second substrate disposed opposite to said first substrate and including an opposite electrode; and
    a liquid crystal layer sandwiched between said first substrate and said second substrate, wherein said pixel electrode has a generally rectangular shape, and a recess in groove shape is formed therein extending from one of a pair of opposite sides of said pixel electrode to the other to divide said pixel electrode into two parts, said recess being formed such that its width is smaller in its central portion in a longitudinal direction of said recess and becomes gradually larger toward each of a pair of 0pposite sides of said pixel electrode.

10. An active-matrix liquid crystal display according to claim 9, wherein, when a voltage is applied between said pixel electrode and said opposite electrode, liquid crystal molecules in said liquid crystal layer are laid toward a longitudinal direction of said recess in accordance with the magnitude of said voltage.

11. An active-matrix liquid crystal display according to claim 9, wherein said pixel electrode is continuously formed across said recess.

12. An active-matrix liquid crystal display according to claim 9, wherein a conductive layer of said pixel electrode is removed in said recess.

13. An active-matrix liquid crystal display according to claim 9, further comprising a guide in bank shape formed on said first substrate along a side of said pixel electrode in parallel with a longitudinal direction of said recess.

14. An active-matrix liquid crystal display according to claim 9, further comprising:
    a polarizer; and
    at least one of an optically negative compensating film and an optically positive compensating film provided between said first substrate or said second substrate and said polarizer, whereby refractive index anisotropy in a layer including said liquid crystal layer and said compensating film is made isotropic.

15. An active-matrix liquid crystal display according to claim 9, wherein said liquid crystal layer comprises a liquid crystal material with negative dielectric constant anisotropy, and liquid crystal molecules in said liquid crystal layer are aligned perpendicularly to each of said substrates when no voltage is applied between said pixel electrode and said opposite electrode.

16. An active-matrix liquid crystal display according to claim 15, further comprising quarter-wave plates provided on both sides of said liquid crystal layer, respectively, said quarter-wave plates having optical axis orthogonal to each other.

* * * * *